United States Patent [19]
Chung et al.

[11] Patent Number: 5,799,109
[45] Date of Patent: Aug. 25, 1998

[54] OBJECT-BY SHAPE INFORMATION COMPRESSION APPARATUS AND METHOD AND CODING METHOD BETWEEN MOTION PICTURE COMPENSATION FRAMES

[75] Inventors: Jae-Won Chung, Seoul; Jin-Hak Lee, Kyonggi-Do; Joo-Hee Moon; Jae-Kyoon Kim, both of Seoul, all of Rep. of Korea

[73] Assignee: Hyundai Electronics Industries Co., Ltd., Kyonggi-Do, Rep. of Korea

[21] Appl. No.: 478,558

[22] Filed: Jun. 7, 1995

[30] Foreign Application Priority Data

Dec. 29, 1994 [KR] Rep. of Korea ............ 94-38898
Dec. 29, 1994 [KR] Rep. of Korea ............ 94-38899
Dec. 29, 1994 [KR] Rep. of Korea ............ 94-38901

[51] Int. Cl.$^6$ .................................................. G06K 9/00
[52] U.S. Cl. .................................. 382/243; 382/236
[58] Field of Search ...................... 382/232, 235, 382/236, 238, 239, 241, 242, 243, 25, 190, 195, 196, 201, 202, 203, 204, 205, 233, 234, 240, 244, 248, 252, 253, 282, 283, 284, 286, 298, 308; 348/413, 564, 400, 416; 375/244; 395/132, 129

[56] References Cited

U.S. PATENT DOCUMENTS

| | | | |
|---|---|---|---|
| 4,307,420 | 12/1981 | Ninomiya et al. | 358/136 |
| 4,849,810 | 7/1989 | Ericsson | 358/133 |
| 5,150,209 | 9/1992 | Baker et al. | 358/133 |
| 5,177,513 | 1/1993 | Saito | 352/129 |
| 5,191,436 | 3/1993 | Yonemitsu | 358/335 |
| 5,220,647 | 6/1993 | Kumagai | 382/242 |
| 5,282,049 | 1/1994 | Hatakenaka et al. | 358/335 |
| 5,343,250 | 8/1994 | Iwamura | 348/564 |
| 5,371,602 | 12/1994 | Tsuboi et al. | 358/335 |

*Primary Examiner*—Leo Boudreau
*Assistant Examiner*—Bijan Tadayon
*Attorney, Agent, or Firm*—Bryan Cave LLP

[57] ABSTRACT

An object-by shape information compression apparatus and a method thereof, which includes a motion compensation prediction circuit provided for motion-compensation-predicting a shape information of a current fame using a shape information of a previous frame and a motion information of a current frame; a subtraction circuit provided for computing a prediction error region by subtracting a shape information predicted by the motion compensation prediction circuit and a current motion region; a threshold operation circuit provided for determining a transfer and disconnection of an information in accordance with time by threshold-operating an isolated prediction error region obtained by the subtraction circuit; a contour prediction circuit provided for compression-coding a shape information by predicting a contour in a prediction error region obtained by the threshold operation circuit; a contour reconstruction circuit provided for reconstructing an isolated prediction error region from a contour coded by the contour prediction circuit; and an addition circuit provided for adding an isolated prediction error region obtained by the contour reconstruction circuit and a shape information of a motion-compensated and -predicted current frame.

25 Claims, 10 Drawing Sheets

FIG.1(Conventional Art)
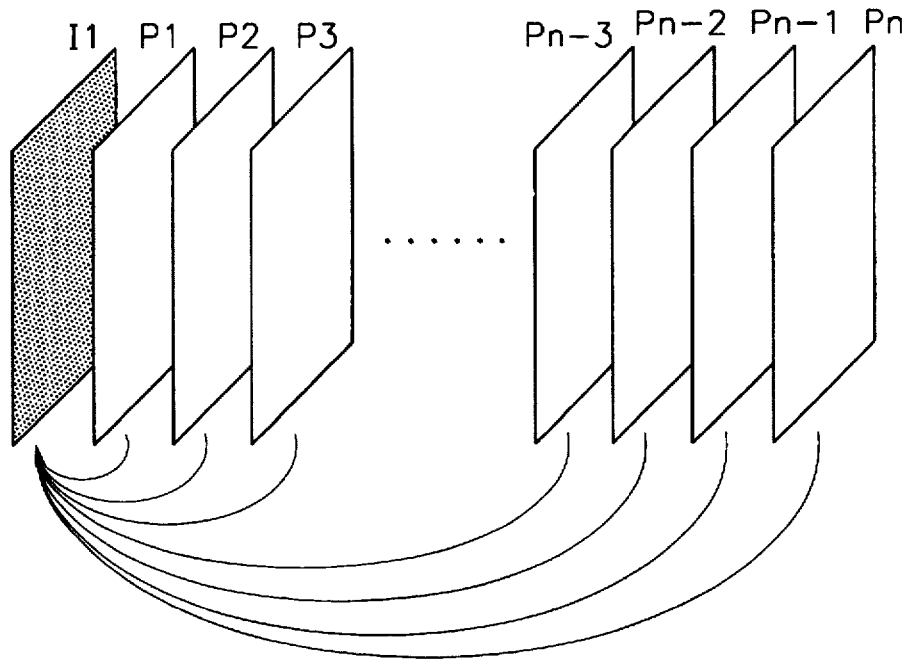
FIG.2A (Conventional Art)   FIG.2B (Conventional Art)   FIB.2C (Conventional Art)
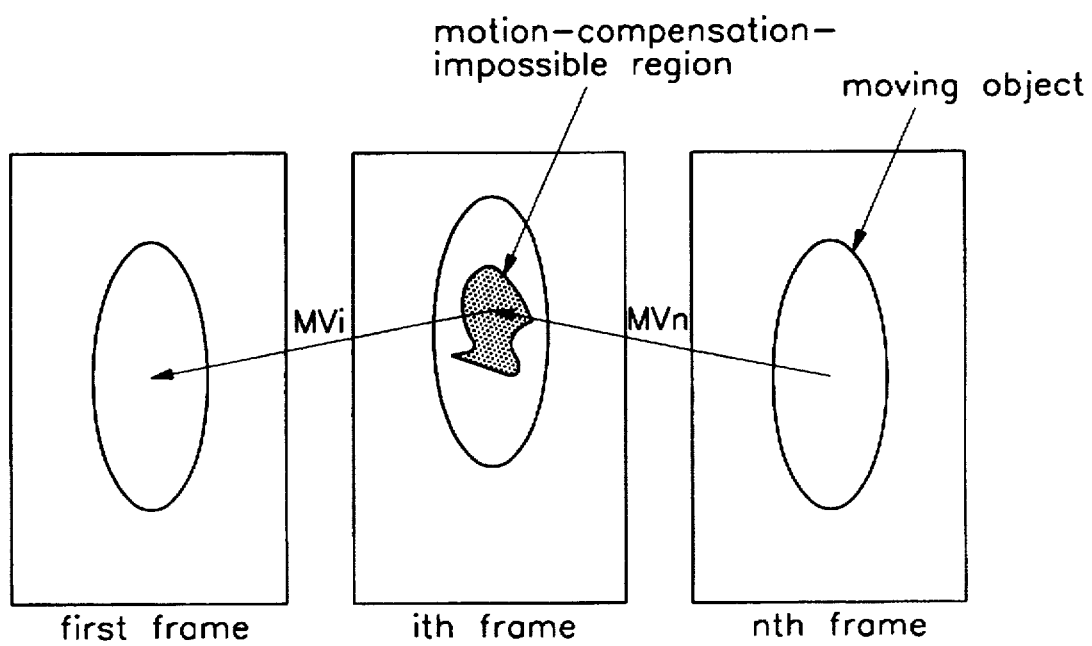

—— transmission contour
—— prediction contour

■ initial vertex
□ approximate vertex elimination

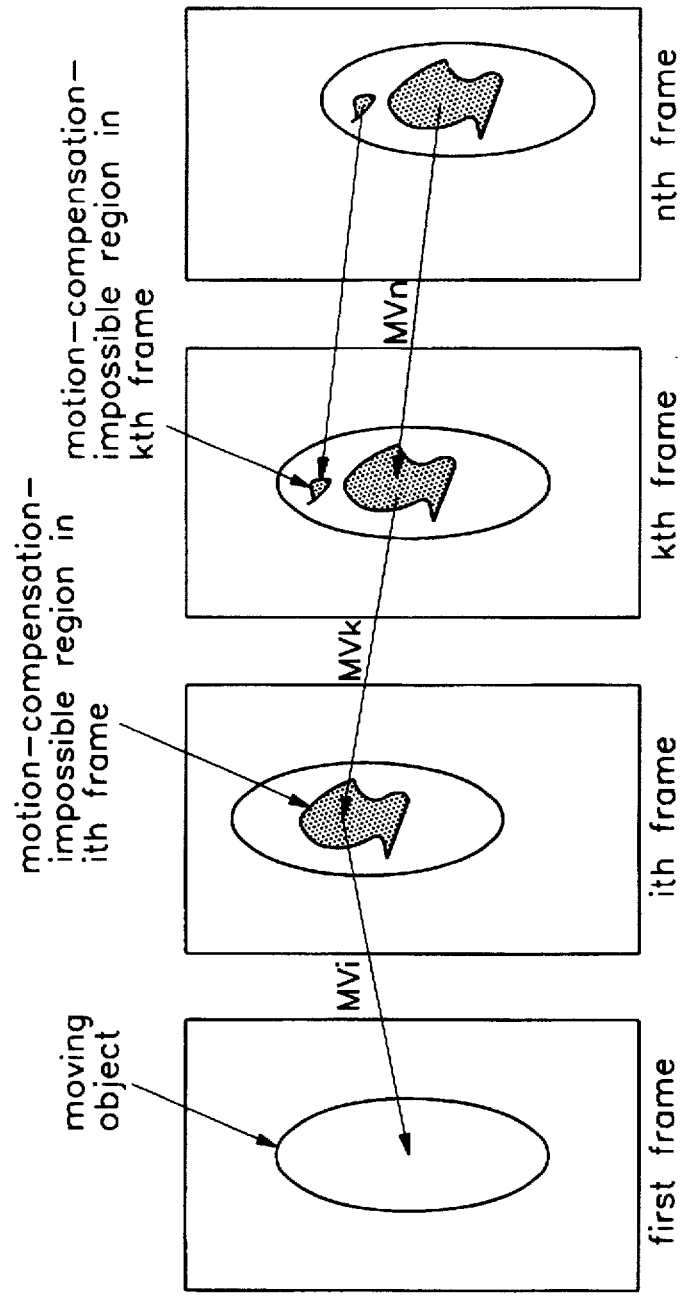

OBJECT-BY SHAPE INFORMATION COMPRESSION APPARATUS AND METHOD AND CODING METHOD BETWEEN MOTION PICTURE COMPENSATION FRAMES

BACKGROUND OF THE INVENTION

1. Field of the Invention

The present invention relates to an object-by shape information compression apparatus and a method thereof and a coding method between motion picture compensation frames thereof, and in particular to an improved object-by shape information compression apparatus and a method thereof and a coding method between motion picture compensation frames thereof capable of compensating a motion of a picture using a frame in which a motion-impossible region is made in a shape information transferring amount reduction and an object-by motion picture coding by predicting an outline of a continued picture and transferring a predicted error by a prediction error region.

2. Description of the Conventional Art

Conventionally, among coding methods between an object-by shape information compression and a motion compensation frame in typical picture instruments, one method disclosed by Hotter is widely used in the industrial field.

The above mentioned method is directed to a motion-compensation-prediction of a vertex used in an approximation after approximating an entire contour of a motion region and to transmit the error thereof.

However, the above described method has disadvantages in that the picture quality can not be enhanced because of transmitting errors after a motion-compensation prediction by approximating the entire shape information.

In addition, according to Hotter's method, it is also directed to transmit a first frame in a coding method between motion-compensation frames and then to transmit the frames after the first frame in a coding method between frames. Here, in case that a motion compensation is performed from the previous frame, there take places a blurring.

In an attempt to resolve the above described problems, there, as shown in FIG. 1, is disclosed a method of compensating a motion from the coded I1 in a frame by obtaining a new motion information between I1 coded in a frame and the I1 after adding all the motion information by the current.

However, in the above described method, in case that there is a motion-compensation-impossible region between a coded I1 and a current frame, the corresponding motion information can not be used.

As shown in FIG. 2, in case of compensating a nth frame from a first frame, a new motion information can be made for a motion compensation by inserting a motion information MVi between a first frame and a ith frame and inserting a motion information MVn between a ith frame and a nth frame.

At this time, the ith frame is a certain frame between the first frame and the nth frame.

However, in case that a motion-compensation-impossible region exists in the ith frame, since it is judged as a motion-compensation-impossible region because the difference between the first frame and the ith frame when the motion is compensated from the first frame using the motion information MVi, the motion information MVi between the first frame and the ith frame can not be used.

Therefore, it is needed to compensate the motion picture by making a new motion information by inserting a motion information MVi between the first frame and the ith frame and a motion information MVn between the ith frame and the nth frame.

SUMMARY OF THE INVENTION

Accordingly, it is an object of the present invention to an object-by shape information compression apparatus and a method thereof and a coding method between motion picture compensation frames thereof, which overcome the problems encountered in a conventional object-by shape information compression apparatus and a method thereof and a coding method between motion picture compensation frames thereof.

It is another object of the present invention to provide an improved object-by shape information compression apparatus and a method thereof and a coding method between motion picture compensation frames thereof capable of compensating a motion of a picture using a frame in which a motion-impossible region is made in a shape information transferring amount reduction and an object-by motion picture coding by predicting an outline of a continued picture and transferring a predicted error by a prediction error region.

To achieve the above objects, there is provided an object-by shape information compression apparatus, which includes a motion compensation prediction circuit provided for motion-compensation-predicting a shape information of a current fame using a shape information of a previous frame and a motion information of a current frame; a subtraction circuit provided for computing a prediction error region by subtracting a shape information predicted by the motion compensation prediction circuit and a current motion region; a threshold operation circuit provided for determining a transfer and disconnection of an information in accordance with time by threshold-operating an isolated prediction error region obtained by the subtraction circuit; a contour prediction circuit provided for compression-coding a shape information by predicting a contour in a prediction error region obtained by the threshold operation circuit; a contour reconstruction circuit provided for reconstructing an isolated prediction error region from a contour coded by the contour prediction circuit; and an addition circuit provided for adding an isolated prediction error region obtained by the contour reconstruction circuit and a shape information of a motion-compensated and -predicted current frame.

To achieve the above objects, there is provided an object-by shape information compression method including the steps of a first step which computes a prediction error region using a motion information of a current frame and a contour of a motion-compensated previous frame; a second step which extracts a prediction contour and a transmission contour in a transmitted prediction error region and computes the number of its pixel; a third step which obtains an evaluation function using a computed pixel number and compares the obtained evaluation function with a threshold value; a fourth step which approximates a transmission contour using a polygon/spline approximation method when the evaluation function is larger than the threshold value; a sixth step which extracts a maximum error value by using a coding method of using a prediction contour when the evaluation function is smaller than the threshold; a seventh step which compares the extracted maximum error value and the threshold value used in the polygon/spline approximation; an eighth step which transmits a predetermined vertex between a point in which a maximum error occurs and both end points of a transmission contour when the minimum error value is larger than the threshold value; and a ninth step which does not transmit an information of a region in which the maximum error value is smaller than the threshold value.

To achieve the above objects, there is provided an object-by shape information compression coding method between motion picture compensation frames thereof, which includes the steps of a first step which performs a code operation with two cases of which one case is when a motion-compensation-impossible region exists and the other case is when a motion-compensation-impossible region does not exists; and a second step which performs a motion compensation in a motion-compensation-impossible region not in a first frame in case that a frame in which a motion-compensation-impossible region exists is provided between a current frame and a first frame so that a motion compensation is performed from the first frame.

BRIEF DESCRIPTION OF THE DRAWINGS

FIG. 1 is a diagram of frames used in a conventional video decoder and coder.

FIG. 2A is a diagram of a first frame of a motion picture of FIG. 1.

FIG. 2B is a diagram of a ith frame of a motion picture of FIG. 1.

FIG. 2C is a diagram of a nth frame of a motion picture of FIG. 1.

FIG. 12A is a diagram of a first diagram of a motion picture compensation with respect to a motion-compensation-impossible region according to the present invention.

FIG. 12B is a diagram of a ith diagram of a motion picture compensation with respect to a motion-compensation-impossible region according to the present invention.

FIG. 12C is a diagram of a kth diagram of a motion picture compensation with respect to a motion-compensation-impossible region according to the present invention.

FIG. 12D is a diagram of a nth diagram of a motion picture compensation with respect to a motion-compensation-impossible region according to the present invention.

DETAILED DESCRIPTION OF THE INVENTION

Figure 3:
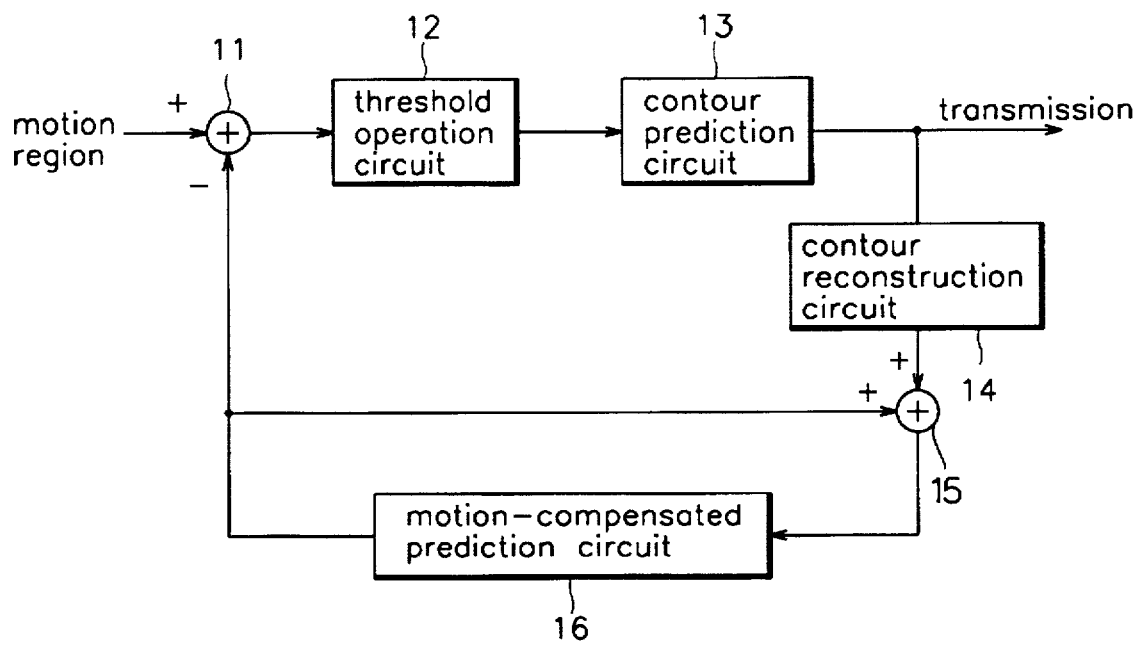
FIG. 3 is a block diagram of a construction of an object-by shape information compression apparatus according to the present invention.

Referring to FIG. 3, there is provided a construction of an object-by shape information compression apparatus for a picture instrument according to the present invention, which includes a motion-compensation prediction circuit 16 provided for motion-compensation-predicting a shape information of a current frame using a shape information of a previous frame and a motion information of a current frame; a subtractor 11 provided for computing an isolated prediction error region by subtracting a shape information of a current frame outputted from the motion-compensation prediction circuit 16 and a motion region information applied thereto; a threshold operation circuit 12 provided for determining a transmission of an information in accordance with a decision on a visual effect by threshold-operating an isolated prediction error region obtained by the subtractor 11; a contour prediction circuit 13 provided for predicting a contour in a prediction error region determined by the threshold operation circuit 12 and for compression-coding the predicted shape information; a reconstruction circuit 14 provided for reconstructing the contour coded by the contour prediction circuit 13 into an isolated prediction error region; and an adder 15 provided for providing the result obtained by adding the isolated prediction error region reconstructed by the contour reconstruction circuit 14 and the shape information of the current frame outputted from the motion-compensation prediction circuit 16 to the motion-compensation prediction circuit.

Figure 9:
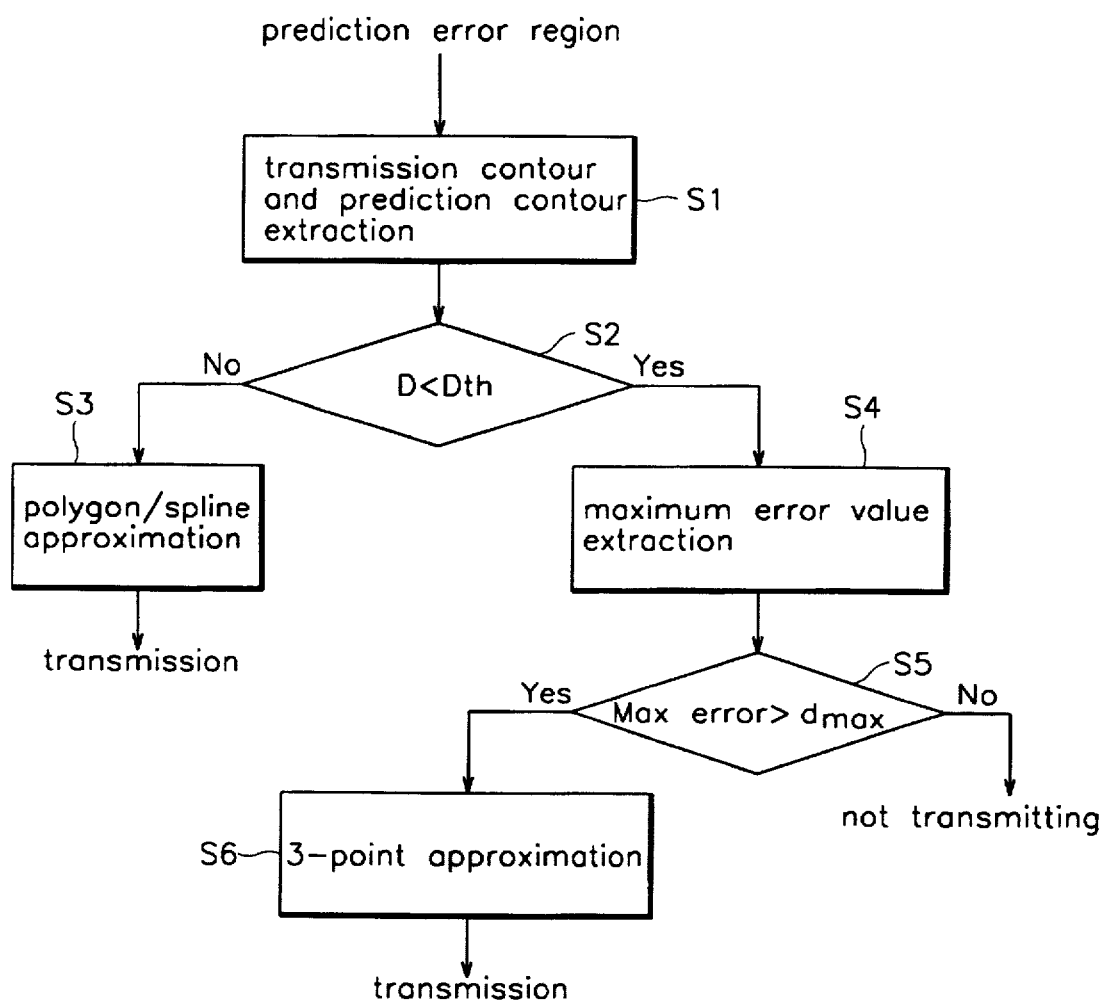
FIG. 9 is a flow-chart of a motion picture compensation contour prediction coding method according to the present invention.

In addition, referring to FIG. 9, the motion-compensation contour prediction coding method according to the present invention includes the steps of a first step S1 which extracts a prediction contour and a transmission contour from a prediction error region obtained by computing a prediction error region from the motion information of a current frame and a contour of a motion-compensated previous frame and obtains the number of pixel; a second step S2 which obtains an evaluation function D using the number of pixel of two contours and compares the obtained evaluation function D with a threshold value Dth; a third step S3 which approximates a transmission contour using a polygon/spline approximation method, which does not use a prediction contour, when the evaluation function D value is larger than the threshold value Dth; a fourth step S4 which extracts a maximum error value MAX by a coding method using a prediction contour if the evaluation function D value is smaller the threshold value Dth; a fifth step S5 which compares the extracted maximum error value and the threshold value used at the time of the polygon/spline approximation; a sixth step S6 which transmits a predetermined number of vertex with the point in which the maximum error occurs and the both ends of the transmission contour as an approximation vertex; and a seventh step which does not transmit information of a region in which the maximum error value is smaller than the threshold value.

Figure 10:
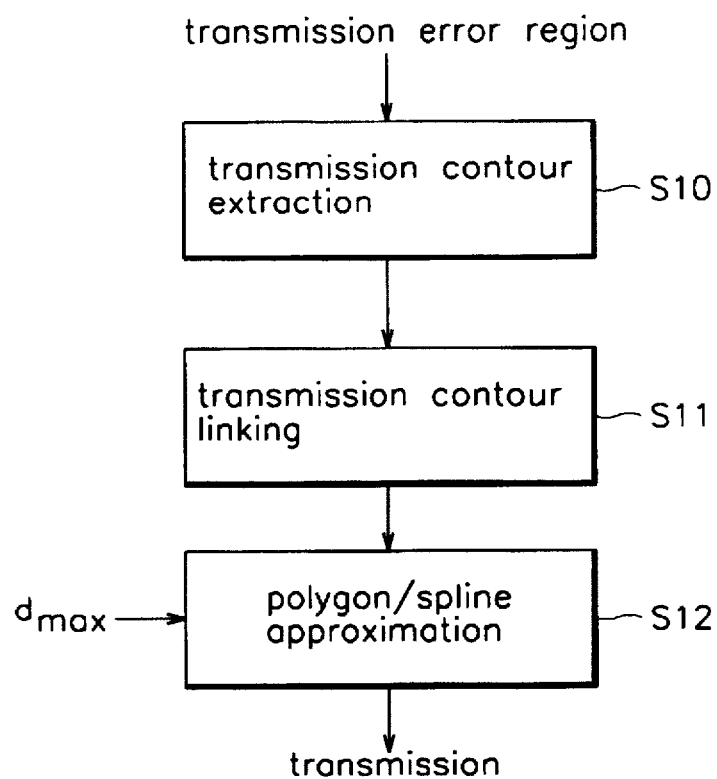
FIG. 10 is a flow-chart of a process of a polygon/spline contour approximation of FIG. 7 according to the present invention.

Referring to FIG. 10, the polygon/spline approximation process according to the present invention includes the steps of a tenth step S10 which obtains a prediction error region using a motion information of a current frame and a contour of a motion-compensated previous frame and extracts a prediction transmission contour from the obtained prediction error region; an eleventh step S11 which links each other neighboring two transmission contours which are within a predetermined distance; and a twelfth step S12 which performs a polygon/spline approximation with respect to the linked transmission contour.

The operation of an object-by shape information compression apparatus and a method thereof and a coding method between motion picture compensation frames thereof will now be explained.

To begin with, in the object-by motion picture coding process, a picture is classified into a previous picture, a changed region having a different signal, and an unchanged background region, in which there is no signal change, in accordance with a motion of an object.

The unchanged background region does not need further picture analyzing process, and information transmission, so that in the receiving terminal—decoding apparatus—the signal of a previous picture is used with no changes.

In the extracted motion region, a motion information of an object is extracted using an object model and its motion model.

In addition, the motion information and a shape information of a motion region is transmitted to a receiving terminal.

In the receiving terminal, a picture is reproduced using a motion-compensated prediction.

As the above described method is directed to presume a motion information by a really moving object, a prediction performance is better than a conventional block-by coding method, thereby to preventing a block effect.

In addition, since a motion information is transmitted to neighboring two pixel which are spaced between an edge of an object, a spot phenomena and edge business can be prevented.

Meanwhile, in the motion region, there is a region having many motion-compensated prediction errors, in which a presumed object model and motion model are not well fitted in regions of eyes and mouth, so more complex motions are presented.

As the above described region is a region sensible to a user, a color information is coded and transmitted so as to reproduce better original signals by a receiving terminal.

Beside, there is presented an uncovered background which is not provided in a previous picture, so the information related thereto is also transmitted.

Figure 4:
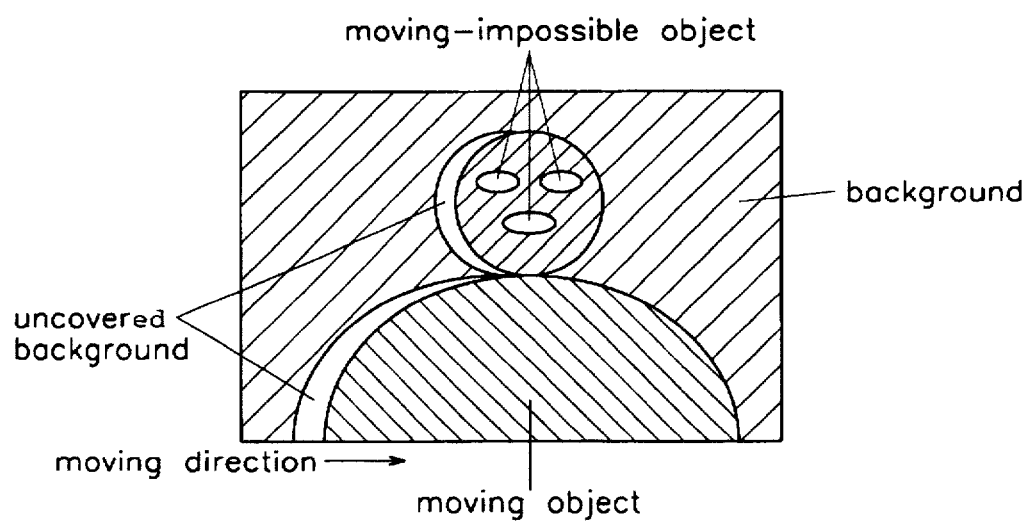
FIG. 4 is a diagram of an example of a motion picture division between a head and a shoulder of FIG. 3 according to the present invention.

Referring to FIG. 4, there is shown a head and shoulder picture which is classified into a background, a motion object, a motion-compensation-impossible object, and an uncovered background.

As described above, the present invention is intended to increasingly compress a shape information with respect to a motion object using a method of coding a shape information of a motion region.

Here, the shape information of a motion region can be expressed in a binary picture or a contour of edge thereof which indicate a region/non-region.

There are overlapping between shape information of a motion region by the same object in the continued picture.

A contour prediction coding method is intended to motion-compensation-predict the contour using the above mentioned characteristic and to compress a shape information by transmitting the prediction error.

In the present invention, the contour prediction coding method is intended to select a transmission prediction error so as to transmit the prediction error and operate the threshold and contour approximation.

The contour prediction coding method has advantageous in that it is easy to compress a shape information without decreasing picture quality and to control a parameter easily compared with a conventional contour prediction coding method.

The contour prediction coding method will now be explained in detail.

The shape information in the object-by motion coding method has the top priority in transmitting from the motion picture prediction together the motion information.

The transmission of the above mentioned shape information is performed to give different motion information to a neighboring pixel with respect to a center of an object edge, so that spot phenomenon and edge business are advantageously prevented, and thus the picture quality is enhanced.

Therefore, the object-by coding method is better than the block-by coding method. Among the methods of expressing an edge of an object, a computer graphics, a character recognition, an object synthesis, etc are widely used in the industrial field. In detail, a chain difference coding, a S-shaped contour method, a polygon approximation, a spline approximation, a Fourier description method are widely used.

However, the above described methods does not consider a transmission method, so that in case of transmitting a contour information of a motion region in each frame, it is hard to transmit effectively due to a relatively high transmission rate.

Therefore, there are many similarities in shape and location between shape information of a motion region generated by the same object in a continued frame, so that it is possible to predict a current shape information from the previous shape information.

Moreover, it is possible to predict a shape information using a predicted motion information of a motion object.

At this stage, the ideal correct motion region extraction and motion information prediction are not needed. What use the above mentioned methods is called as a contour prediction coding method.

However, since the lower the transmission is, the less the shape information occupies, a relatively much compression of a shape information is needed so as to obtain a coding gain compared a block-by coding method in which a shape information transmission is not needed.

The present invention, therefore, uses a threshold operation and a contour approximation for selecting a transmission prediction error.

At this time, at the time of a motion-compensated prediction of a current shape, an isolated prediction error region occurs.

Figure 5:
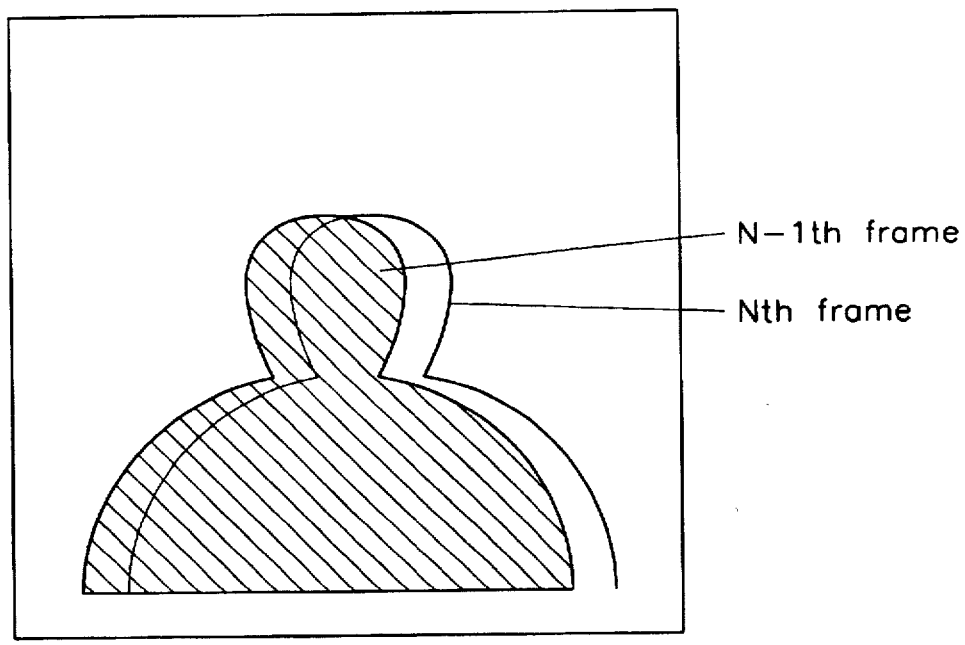
FIG. 5 is a diagram showing a previous frame and a current frame of a head and shoulder of FIG. 4 according to the present invention.
Figure 6:
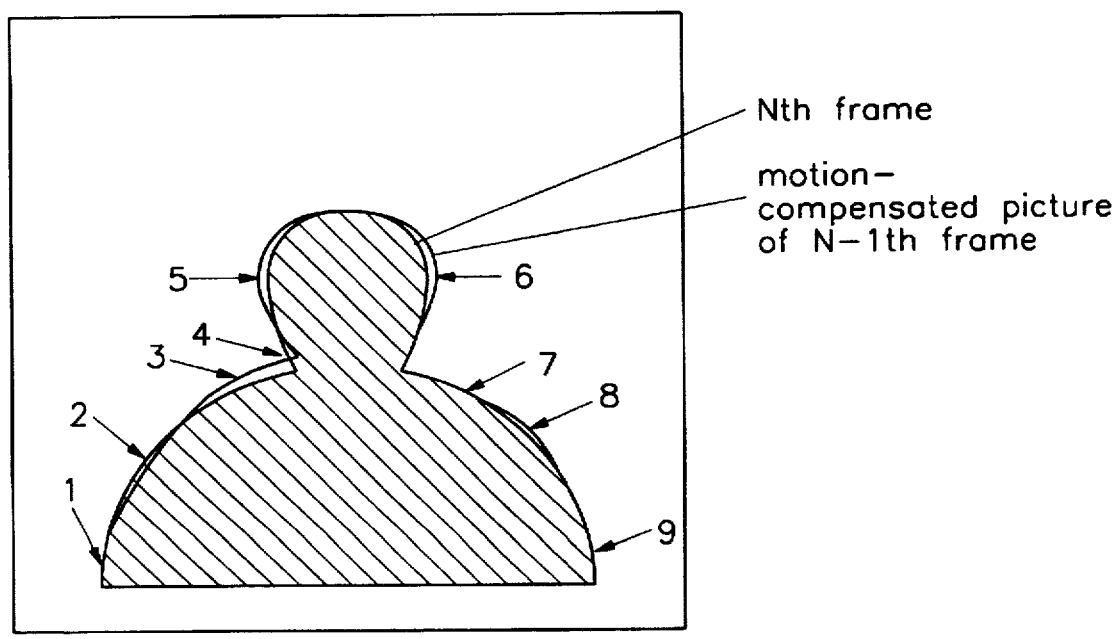
FIG. 6 is a diagram of a motion picture obtained by compensating a previous frame and a current frame of FIG. 3 according to the present invention.

Here, FIG. 5 shows a shape information of previous frames N through 1th and a current frame Nth. FIG. 6 shows nine isolated prediction error regions of when a current frame is moved in accordance with an movement of a shape information of previous frames N through 1th along a motion information.

With respect to each of nine prediction error regions, a region corresponding to a current frame is coded and transmitted.

The transmission of a prediction error can include information which does not affect a visual sense of human body.

To make the low-transmission rate possible, it is required to transmit the important information affecting a picture quality and not transmit the less important information.

Therefore, the information not affecting the picture quality is eliminated by a threshold operation.

At this time, the threshold operation uses characteristics of a region in which an error occurs.

For transmitting a prediction error region information previously set up for the transmission itself, it is intended to use an approximation method.

At this stage, as a contour approximation method, a polygon/spline approximation method is used.

The construction of a motion-compensated contour prediction coding method for compressing a shape information is shown in FIG. 3, which includes a prediction circuit 16 provided for predicts a shape information of a previous frame and a shape information of a current frame; a subtractor 11 provided for computing a difference value between the output value of the motion-compensated prediction circuit 16 and the motion region information value; a threshold operation circuit 12 provided for transmitting the information affecting to a visual sense of human body and for not transmitting the information not affecting to a visual sense of human body by performing a threshold operation with respect to an isolated prediction error region obtained by the subtractor 11; a contour prediction circuit 13 provided for compressing a shape information using a approximation method so as to transmit the prediction error region information which is previously determined to transmit; and a contour reconstruction circuit 14 provided for reconstructing a contour coded by the threshold operation circuit 12 and the contour prediction 13 into an isolated prediction error region; and an addition circuit 15 provided for constructing a shape information of a current frame and for inputted the constructed shape information into the motion-compensated prediction circuit 16 by adding the prediction error region isolated by the contour reconstruction circuit 14 and the output value of the motion-compensated prediction circuit 16.

The operation of an occurrence of a prediction error region between two motion regions and a threshold operation thereof and a contour coding for transmitting the error region information will now be explained.

To begin with, the threshold operation is intended to use the size, shape, etc of an error region, so it needs a concept on a shape information prediction error.

Therefore, the threshold operation based on the occurrence and its reason of the error region will now be explained.

A shape information and motion information of a motion region of each picture are extracted from two real pictures.

That is, the extracting process of a current shape information is separated from a shape information of a previous picture.

For more correct prediction between two shape information, the extraction of a motion region and a prediction of a motion information should be correct. Preferably, a transmission of a shape information is not required.

However, there may occur a shape information prediction error due to the limit of a motion information prediction method and its signal characteristics.

In addition, the motion region includes an uncovered background along with a moving object.

The uncovered background region is not related to the motion information, so the motion-compensated prediction is impossible, and some errors occur.

In consideration of human's visual sense which is sensible to a shape and movement of an object, since the shape information and prediction information may include information which is not sensible to human's visual sense, in the present invention, those error is advantageously eliminated by a threshold operation and not transmitted.

The non-transmission of those errors ensure more effective transmission rate in the picture quality.

The threshold operation in the above described prediction coding method includes two function: the elimination of small error regions and shape information changes.

To begin with, the small error regions will now be explained.

Looking at the contour of the shape information at a predetermined distance, it may look more simple, however, looking at it at a more close distance, there are very complicated changes in each contour.

Due to the above described characteristics, when the difference of pixel units is performed with two binary images of a prediction shape information and a real shape information, many regions having several or tens of pixels are generated. If the prediction is more correct, the overlapped region of added regions or subtracted region may occur.

To eliminate the meaningless error region, it is required to eliminate the small error region.

The selection of threshold value which is required to eliminate the small error region can be extended in maximum to the size of the region in which human's visual sense is not sensible.

Therefore, the elimination of the small error region having a proper threshold value is made to compress the transmission rate while not affecting the picture quality by dividing the contour of a moving object into several independent error region, so that the following-up operation can easily be performed.

Next, the operation on the elimination of a meaningless shape information change will now be explained.

The human's visual characteristics are sensible to the shape and movement of an object rather than a location error of an object.

Therefore, the rapid changes of the shape information of an object generated due to a signal characteristic or a motion region extraction matter are in general meaningless shape information changes.

For transmitting those rapidly changing shape information, a much more amount of data is required, while decreasing a picture quality.

Therefore, it is required not to transmit those information. The error region in which a transmission is determined performs a coding of a contour.

The contour of an error region includes a prediction contour of a motion-compensated prediction shape information.

Here, the contour in which a prediction contour is eliminated is coded and transmitted.

In the picture of a head and shoulder, if a chain difference coding which does not have errors in a transmission contour coding in a region and have many stripe-shaped error regions is used, the transmission data amount increase.

Therefore, it is required to adapt a contour coding method using an approximation expression. At this time, partial location error of the contour may be occur.

However, since human's visual sense is sensible to the shape of an object, due to those small error, the picture quality can not be decreased.

Figure 7A:
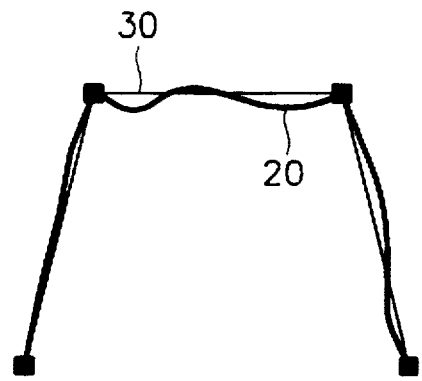
FIGS. 7A through 7C are diagrams showing a process of a polygon and spline contour approximations of FIG. 3 according to the present invention.

The operation of a polygon/spline approximation process which is used for a contour approximation will now be explained with reference to FIGS. 7A through 7C.

The contour 20 of an error region which a transmission is determined is approximated by a polygon 30.

At this time, the number of vertex of the polygon 30 is subject to the level of approximation between a real transmission contour 20 and a approximate polygon 30.

The level of an approximation can be expressed using the maximum difference between the real transmission contour 20 and the approximate polygon 30. Here, if the maximum difference is big, a rough approximation is made. If the maximum difference is small, more correct approximation is made; however, the number of vertex increase.

Figure 7B:
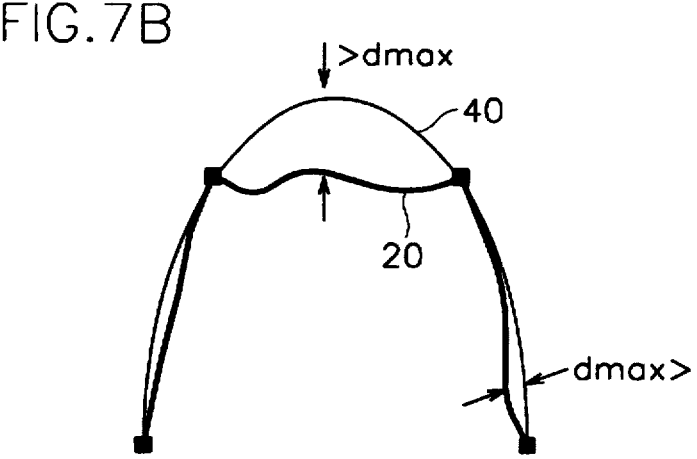
Figure 7C:
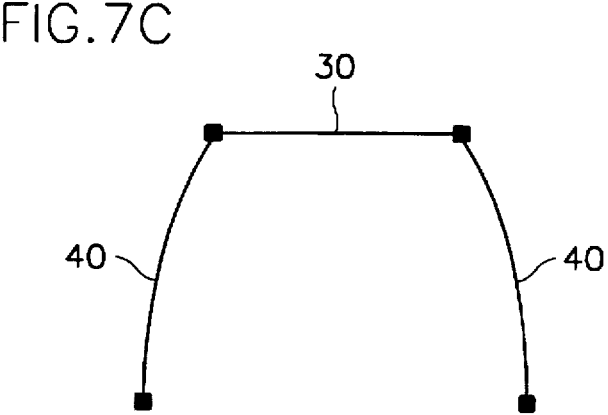

In addition, as shown in FIG. 7B, a spline 40 passing obtained approximate vertexes is obtained. The distance between each pixel of the spline 40 and the transmission contour 20 is checked, if the distance is larger than the threshold value dmax, as shown in FIG. 7C, the approximation for the approximation distance including the pixels is performed with the polygon 30, not with the spline 40.

In addition, the index which indicates whether the distance between the location of a vertex and a vertex is a polygon approximation or the distance is a spline approximation, is transmitted to a receiving terminal, and the polygon/spline is made.

The contour approximation in which a polygon and spline are combined is more softly sensible to human's visual sense.

The process of approximating a certain number of transmission contours using a polygon/spline approximation method will now be explained.

To begin with, the process includes the steps of a tenth step which locates a transmission contour from an error region in which a transmission is determined after a threshold operation; an eleventh step which links neighboring two transmission contours each other; and a twelfth step which performs a polygon/spline approximation with respect to the linked transmission contour.

The above described process will now be explained in detail with reference to FIG. 10.

The transmission contour is located from the error region in which a transmission is determined after an approximation operation—ST 10.

At this time, an unnecessary vertex may occur between neighboring contours.

To avoid the above described problems, the step ST11 is performed to link two neighboring transmission contours.

In addition, the polygon/spline approximation is performed with respect to the linked transmission contour—ST12.

FIG. 11 shows a linking process of linking two neighboring contours according to the present invention.

Figures 11A, 11B, 11C:
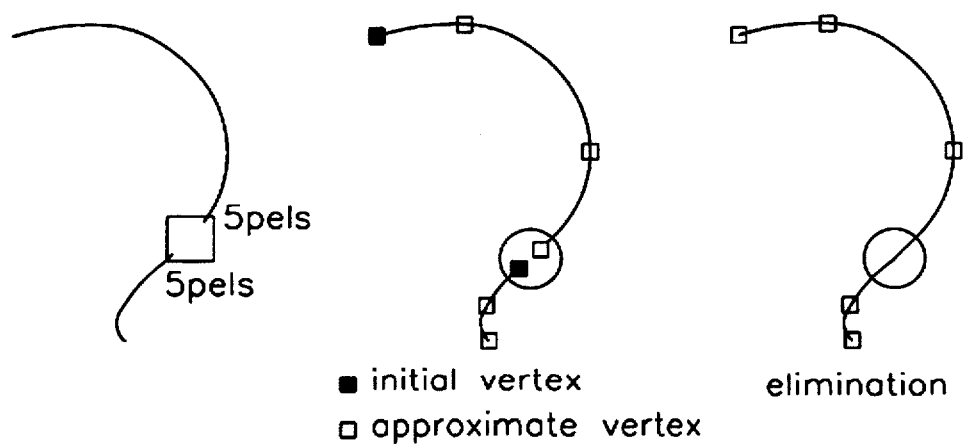
FIGS. 11A through 11C are diagrams of a process of linking neighboring two contours of FIG. 10 according to the present invention.

As shown in FIG. 11A, in case that two neighboring contours are close to each other, the end vertex of an upper contour and an initial vertex of a lower contour is repeatedly transmitted as shown in FIG. 11B.

Therefore, as shown in FIG. 11C, after the two neighboring contours are linked, the approximation is performed, so that an approximate vertex and an initial vertex are respectively reduced by one, and thus the transmission amount are reduced as much as the reduced vertex.

In the conventional contour prediction coding method, it is directed to first approximate with the polygon/spline and to motion-compensated-predict the contour with the approximated vertex.

On the contrary, the polygon/spline approximation method according to the present invention is directed to divide the entire contour into a plurality of transmission contours and approximate each divided transmission contour.

In addition, by eliminating the small error region and approximating the compression of the transmission rate, the several small transmission contours are easily approximated.

In addition, using the threshold value dmax which is different from each transmission contour and the threshold value tsm used for the small error region, the control of the shape information transmission is more easily performed.

In another contour approximation, the approximation method of using a prediction contour is shown in FIG. 8.

That is, as shown therein, however, the motion region extraction is well done, the prediction contour and the transmission contour are similar in their shape in the error region occurred by the motion information prediction.

In this case, the transmission contour can be approximated using the prediction contour.

The above described method has more easy operation thereof and is directed to compress the information amount.

Figure 8A:
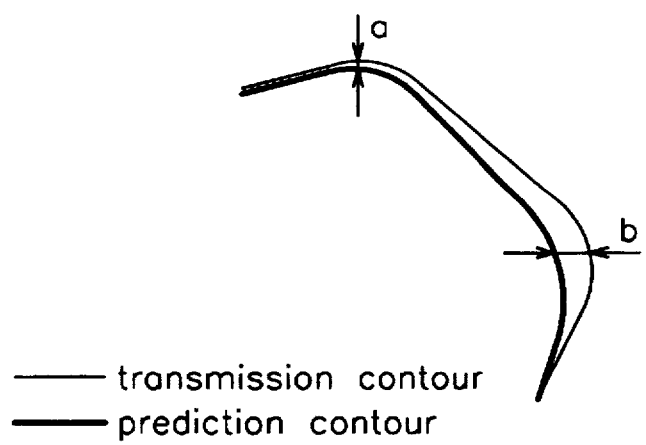
FIGS. 8A through 8C are diagrams showing a process of a contour approximation using a predictive contour according to the present invention.
Figure 8B:
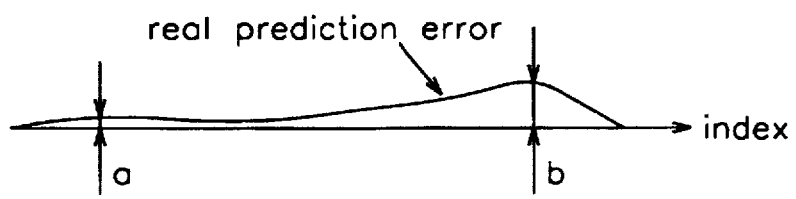
Figure 8C:
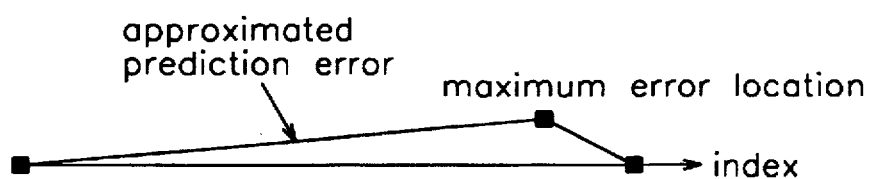

FIG. 8 shows an approximation process using a prediction contour. As shown in FIG. 8A, the error size with respect to the prediction contour as shown in FIG. 8B is obtained so that the transmission contour of the error regions a and b which are occurred due to the motion information prediction rather than the motion region extraction. In addition, as shown in FIG. 8C, the approximation error is drawn within a frame with respect to a prediction contour after the approximation.

The above described method does not require a spline approximation so as to indicate a visually natural shape since the occurrence of a contour is subject to a prediction contour.

As a method of approximating an error size, the polygon method can be considered; however, since it has a lower curvature in which an error size is low in an approximation using a contour, the approximation is possible with vertexes less than the number of the vertex in the frame.

However, since the polygon approximation coding method is effective in case that it has a relatively high curvature, it is intended to approximate with the point i which the maximum error occurs and both ends of the transmission contour as the approximation vertex, not using the polygon approximation method of approximating the prediction contour.

For approximating the transmission contour having a high curvature, the polygon/spline approximation require several number of the vertex in the frame, however, in the approximation using a contour, three vertexes are required to transmit, so that the number of the transmission vertex decreases.

As shown in FIG. 8C, in the receiving terminal, the approximation error is drawn in the frame after approximating the error with two straight line connected between both end and the maximum error location.

In case of considering the approximation in the entire frame, the well-extracted region and bad-extracted region are generated at the same time, and at this time, the method of a transmission with respect to each region includes the steps of a first step which computes the length of a transmission contour and a prediction contour and the number of the pixel; a second step which judges whether an object extraction of a region is well performed using the number of pixel of two contours obtained by the first step; a third step which codes a transmission contour using a polygon/spline approximation method when the object extraction is not well done; a fourth which first extracts the maximum value using a prediction contour when the object extraction of the region is well done; a fifth step which judges whether the extracted maximum error value is larger than the threshold value dmax used for the polygon/spline approximation, and a sixth step which approximates the point in which the maximum error occurs and both ends of a transmission contour as an approximation vertex when the maximum error value is larger than the threshold value dmax and transmits three vertexes.

The operation of the above described method will now be explained in detail with reference to FIG. 9.

To begin with, a prediction contour and a transmission contour is located from a transmission error region, and its length and the number of pixel are obtained—S1.

Using the number of two contours obtained by the first step S1, whether the object extraction is well done or not is judged—S2.

At this time, the evaluation function D which is a judgement reference is as follows.

$$D = \frac{|\text{number of transmission contour} - \text{number of prediction contour}|}{(\text{number of transmission contour} - \text{number of prediction contour})/2}$$

where D is an evaluation function.

In a region in which the object extraction is not well done, since the difference of the number of pixel between two pixels is large, the evaluation function D increases.

In case that the threshold value Dth is given, when the evaluation function D in the error region in which a transmission is determined is larger than the threshold value Dth, it is judged that there is some problems therein, so that the transmission contour coding is performed using the polygon/spline approximation method in which the prediction contour is not considered—S3.

If the evaluation function D in the error region is smaller than the threshold value Dth, a coding method using the prediction contour is used. The process thereof is as follows.

To begin with, the maximum error value MAX ERROR is extracted—S4. Whether the extracted maximum error value is larger than the threshold value dmax used in the polygon/spline approximation is determined—S5.

The region information is not transmitted when the maximum error value is smaller than the threshold value dmax.

Since the approximation error is small eventhough the above described region are not transmitted, there are no problems, and the long strip-shaped error region is related thereto.

In case that the maximum error value is larger than the threshold value dmax, the point in which the maximum error occurs and both ends of the transmission contour are approximated as an approximation vertex, and three vertexes thereof are transmitted—S6.

A transmission contour method using a prediction contour does not performs a process of combining neighboring error regions in order to keep an error characteristic unlike the polygon/spline approximation.

In case that vertexes indicating both ends in neighboring two contours after computing vertexes, one vertex obtained from two vertexes can be used, and an index presenting the vertex can be transmitted.

In addition, compared with the conventional methods, the approximation method using a contour has advantages in that it approximate three vertexes in each transmission contour, not compressing the transmission amount and approximating a spline.

In addition, the present invention is directed to provide a method of first compensating a motion picture from a coded frame after adding all the coded frames and directed to divide the region into one region in which a motion-compensated region exists and another region in which a motion-compensated region does not exist.

That is, one region is divided into two regions: one region has a signal different from a previous picture and another region, background region, in which a signal change does not exist in accordance a motion of a picture outputted from the object-by motion picture coding.

The background region does not require further analyzing processes or information transmission since the receiving terminal reproduce a signal of a previous picture.

In the extracted portion region, a motion information of an object is obtained using an object model and moving model.

In addition, the receiving terminal receives a motion information and a shape information of a motion region.

The receiving terminal reproduce a picture with a motion-compensated information using those information.

Compared with the conventional block-by coding method, since the above described method according to the present invention is directed to predict an object-by motion information, the prediction performance is better, and the block effects can be prevented, so that the picture quality is enhanced.

In addition, since the transmission of a shape information is performed to provide different motion information from each other to two neighboring pixels respectively, a spot phenomenon and edge business can be prevented.

Meanwhile, in the motion region, there may be some regions in which a motion-compensated prediction error, which means that a predicted object model is not fitted or a motion model is not fitted, occurs in the region of eyes, mouth, and etc.

Since those regions are sensible to a user, a color information is coded by a receiving terminal for better color reproduction.

Beside, due to the motion of an object there may be exist a uncovered background, in which a previous information does not include, so the transmission of the information thereon is required.

That is, the object-by coding method according to the present invention is directed to improve the conventional Hotter's method by providing a frame in which a motion-compensation-impossible region exists and another frame in which a motion-compensation-impossible region does not exist by computing a new motion information between a coded frame and a current frame after adding the frames from a coded frame to a current frame.

At this time, in case that a nth frame is first compensated as a first frame, a new motion information is made to add a motion information between a first frame and a ith frame and a motion information between a ith frame and a nth frame. In case that a motion-compensation-impossible region exits in the ith frame, it is judged as a motion-compensation-impossible region because there is big difference between the first frame and the ith frame which is obtained when the motion compensation is performed from the first frame using the motion information between the first frame and the ith frame.

To resolve the above described problems, a color information is transmitted with respect to the motion-compensation-impossible region, instead of compensating the motion information.

Therefore, in case that the frame in which a motion-compensation-impossible region exists between the current frame and the first frame, the motion compensation is performed in the motion-compensation-impossible region, not in the first frame, so that the above described problems is resolved.

At this time, with respect to all of the pixel of the current frame, it is needed to judge whether the motion-compensation-impossible region exists between the first frame and the current frame or not. If the motion-compensation-impossible region is judged to be therebetween, what frame includes the region should be judged.

FIG. 12 shows a process of motion-compensating the motion-compensation-impossible region.

Figure 13A:
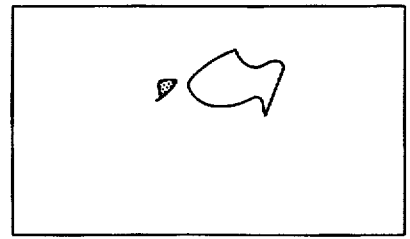
FIGS. 13A through 13B are diagrams of a construction of a frame obtained by motion-compensating a motion-compensation-impossible region according to the present invention.

Referring to FIG. 12, the motion-compensation-impossible region occurred in the ith frame is motion-compensated by the kth frame, so that a new frame indicating effects from the motion-compensation-impossible region of a previous frame and the motion-compensation-impossible region is constructed as shown in FIG. 13A by adding the compensated region by the kth frame in FIG. 12 and the motion-compensation-impossible region occurred by the kth frame in FIG. 13A. Here, the motion-compensation-impossible region is a region affecting the kth frame.

Figure 13B:
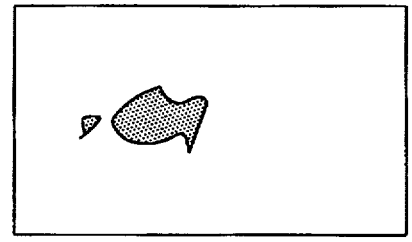
Figure 14A:
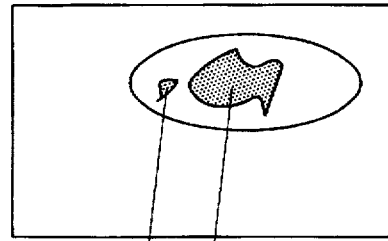
FIG. 14A is a diagram of a first frame of a pixel value with respect to a motion-compensation-impossible region according to the present invention.
Figure 14B:
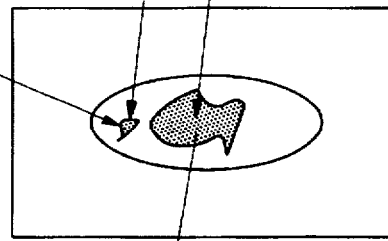
FIG. 14B is a diagram of a ith frame of a pixel value with respect to a motion-compensation-impossible region according to the present invention.
Figure 14C:
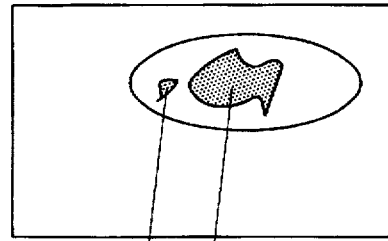
FIG. 14C is a diagram of a kth frame of a pixel value with respect to a motion-compensation-impossible region according to the present invention.
Figure 14D:
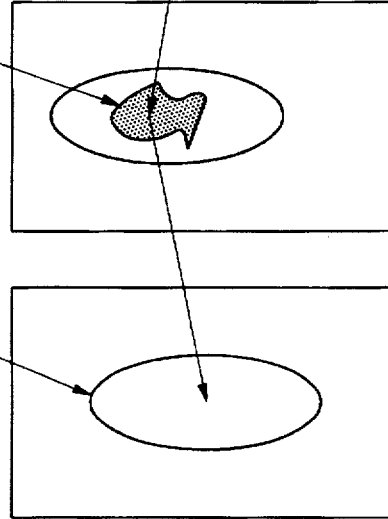
FIG. 14D is a diagram of a nth frame of a pixel value with respect to a motion-compensation-impossible region according to the present invention.

Using the same method, a new frame, obtained by motion-compensating the motion-compensation-impossible region obtained by the kth frame, is constructed as shown in FIG. 13B. Here, new frame means a region in which the motion-compensation-impossible region affects the nth frame.

Referring to FIG. 12, the ith frame is a certain frame between the first frame and the kth frame. In addition, the kth frame is a certain frame between the ith frame and the nth frame.

Using the frame shown in FIG. 13B, it is determined whether the motion compensation is performed from the first frame, or the motion compensation is performed from what frame.

In case that the information with respect to all the motion-compensation-impossible region doest not exist, it is possible to motion-compensate from the previous frame instead of the motion-compensation-impossible region.

FIG. 14 shows a pixel value with respect to the motion-compensation-impossible region. If the value of the motion-compensation-impossible region made by the ith frame is indicated as "i," and the value of the motion-compensation-impossible region made by the kth frame is indicated as "k," the region in which the motion-compensation-impossible region of the ith frame is motion-compensated is indicated as "i," and the value of the motion-compensation-impossible region made by the kth frame is indicated as "k."

Figures 15A, 15B:
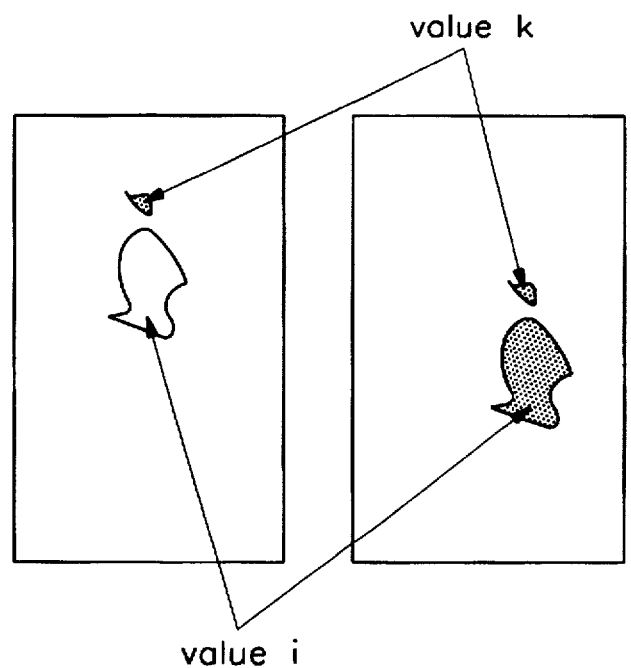
FIGS. 15A through 15B are diagrams of a frame obtained by motion-compensating a motion-compensation-impossible region, each in which a pixel value is indicated, according to the present invention.

In addition, the frame shown in FIG. 15A is motion-compensated, the region which is motion-compensated by the motion-compensated-impossible of the ith frame is indicated as "i" value, and the region which is motion-compensated by the motion-compensation-impossible region of the kth frame is indicated as "k" value as shown in FIG. 15B.

Using the new frame as shown in FIG. 15B, it is possible to distinguish a motion-compensation-possible region from the motion-compensation-possible region and the motion-compensation-impossible region from the initial picture, and it is judged what frame is to be motion-compensated.

As described above, an object-by shape information compression apparatus and a method thereof and a coding method between motion picture compensation frames thereof according to the present invention is directed to advantageously compress the shape information of a moving object and reduce the transmission data amount, so that the picture quality is enhanced.

What is claimed is:

1. An object-by shape information compression apparatus comprising:

motion compensation prediction means provided for motion-compensation-predicting shape information of a current frame using the shape information of a previous frame and motion information of a current frame;

subtraction means for computing a predicted error region by subtracting the shape information predicted by the motion compensation prediction means from a current motion region;

threshold operation means for performing a threshold operation on the isolated predicted error region obtained by the subtraction means for transmitting visually perceptible information;

contour prediction means for compression-coding shape information by predicting a contour in the predicted error region obtained from the threshold operation means;

contour reconstruction means for reconstructing an isolated predicted error region from the contour coded by the prediction means; and addition means for adding an isolated predicted error region obtained by the contour reconstruction means and the shape information of a motion-compensated and -predicted current frame.

2. The apparatus of claim 1, wherein the threshold operation means eliminates regions containing information wherein the predicted error of the shape information is not visually perceptible, and transmits those regions with visual characteristics that may be visually sensed with respect to the shape and movement of an object.

3. The apparatus of claim 1, wherein the threshold operation means compares the pixels of binary images of the predicted shape information and the real shape information.

4. The apparatus of claim 1, wherein the threshold operation means reduces the transmission rate by eliminating regions with fewer that a predetermined number of errors below which is not visually perceptible thereby not affecting a picture quality.

5. The apparatus of claim 1, wherein the threshold means eliminates shape information caused by fast shape changes.

6. The apparatus of claim 1, wherein the contour prediction means eliminates prediction contours included within a contour of an error region and code a transmission contour.

7. The apparatus of claim 1, wherein the contour prediction means approximates a transmission contour obtained by the threshold operation means through chain-difference-coding.

8. The apparatus of claim 6, wherein the contour prediction means approximates a transmission contour obtained by the threshold operation means through chain-difference-coding.

9. An object-by shape information compression method, comprising the steps of:
   computing a prediction error region using motion information of a current frame and the contour of a motion-compensated previous frame;
   extracting a prediction contour and a transmission contour in a transmitted prediction error region and computing its number of pixels;
   obtaining an evaluation function using the computed number of pixels comparing the obtained evaluation function with a threshold value;
   approximating a transmission contour using a polygon/spline approximation method when the evaluation function is larger than a threshold value;
   extracting a maximum error value when the evaluation function is smaller than the threshold;
   comparing the extracted maximum error value and the threshold value used in the polygon/spline approximation;
   transmitting a predetermined vertex between a point in which a maximum error occurs and both end points of a transmission contour when the minimum error value is larger than the threshold value; and
   not transmitting information of a region in which the maximum error value is smaller than the threshold value.

10. The method of claim 9, wherein the contours are motion-compensation-predicted using the overlap between shape information of the same object in a motion region and compressing the shape information data by transmitting the prediction error.

11. The method of claim 9, wherein if the current frame is motion-compensation, the contour of a moving object is divided into independent error regions and the shape information is coded and transmitted.

12. The method of claim 11, wherein the region corresponding to the shape information of a current frame with respect to each of the prediction error regions is coded and transmitted.

13. The method of claim 9, wherein to approximate a transmission contour to a prediction contour, an approximate error is within a frame with respect to a prediction contour after an error size with respect to a prediction contour is obtained and approximated.

14. The method of claim 13, wherein when the error size is computed, a contour is approximated based on a real error value having a lower curvature rate by computing a differential value of a transmission contour.

15. The method of claim 14, wherein a polygon approximation method is used to approximate the error size.

16. The method of claim 14, wherein three vertices are transmitted using a point in which a maximum error occurs and both ends of a transmission contour to approximate the error size.

17. The method of claim 16, wherein the approximation error is presented to be within a frame adding to a prediction contour so that a contour is obtained.

18. The method of claim 9, wherein the contour is approximated by dividing a region into a well-extracted region and a poorly-extracted region at the time of transmission contour approximation with respect to an entire frame.

19. The method of claim 9, wherein the evaluation function is as follows:

$$D = \frac{|\text{number of transmission contour} - \text{number of prediction contour}|}{(\text{number of transmission contour} - \text{number of prediction contour})/2}$$

20. The method of claim 9 further comprising the step of transmitting an index indicating a vertex when there are two vertexes neighboring each other.

21. An object-by shape information compression method comprising the steps of:
   computing a prediction region using motion information of a current frame and the contour of a motion-compensated previous frame;
   extracting a prediction transmission contour from a transmitted prediction error region by compressing one approximating vertex and one vertex by reapproximating an end approximating vertex of a higher contour and an initial vertex of a lower contour when two transmission contours are neighbors; and
   performing a polygon/spline approximation with respect to the transmission contour.

22. An object-by shape information compression coding method between motion picture compensation frames, comprising the steps of:
   performing a coding operation to determine when a motion-compensation-impossible region exists and when a motion-compensation-impossible region does not exist; and
   performing motion compensation in a motion-compensation-impossible region in a particular frame when the particular frame is between a current frame and a first frame so that motion compensation is performed from the first frame, wherein the particular frame is an ith frame between a first frame and an nth frame, and is added with a motion-compensation-impossible region obtained in a kth frame provided between a ith frame an a nth frame and constitutes another first frame represents both a region of a motion-compensation-impossible region of a previous frame and a motion-compensation-impossible region of a current frame, and in the same manner a new second frame is constituted by motion-compensation at the nth frame a motion-compensation-impossible region provided by the kth frame, so that where a motion compensation is performed is determined using a new second frame.

23. The method of claim 22, wherein the motion compensation is performed by a previous frame not by a motion-compensation-impossible region in case that information corresponding to all of the motion-compensation-impossible region is not provided.

24. The method of claim 22, wherein when a value of a motion-compensation-impossible region occurred in a ith frame is indicated as "i," and when a value of a motion-compensation-impossible region occurred in a kth frame is indicated as "k," in the kth frame, a motion-compensation-impossible region of the ith frame is indicated as "i," and the value of motion-compensation-impossible region occurred in the kth is indicated as "k," and in the ith frame, a motion region compensated from a motion-compensation-impossible region of the ith frame is indicated as "i," and a region compensated from a motion-compensation-impossible region of the kth frame is indicated as "k."

25. The method of claim 24, wherein the frames that are motion-compensated and the frames that are motion-compensation-impossible are determined using a new frame constituted the ith frame.

* * * * *